United States Patent [19]

Chang et al.

[11] Patent Number: 5,177,143
[45] Date of Patent: Jan. 5, 1993

[54] METHOD OF MAKING HEAT STABLE POLYMERIC GELLOID COMPOSITION

[75] Inventors: Rong J. Chang; Lester T. Toy, both of Fremont, Calif.

[73] Assignee: Raychem Corporation, Menlo Park, Calif.

[21] Appl. No.: 485,699

[22] Filed: Feb. 27, 1990

Related U.S. Application Data

[60] Division of Ser. No. 271,394, Nov. 10, 1988, abandoned, which is a continuation of Ser. No. 859,162, May 2, 1986, abandoned, which is a continuation-in-part of Ser. No. 772,073, Sep. 3, 1985, abandoned, which is a continuation-in-part of Ser. No. 646,555, Aug. 31, 1984, abandoned.

[51] Int. Cl.$^5$ ............... C08K 5/01; C08L 23/26; C08L 63/00
[52] U.S. Cl. ............... 524/848; 524/775; 524/776; 524/871; 524/876; 523/400; 523/463; 523/173; 174/68.1; 264/22; 264/272.13
[58] Field of Search ............... 524/297, 483, 574, 848, 524/775, 776, 871, 876; 252/315.1; 525/331.7; 523/173, 400, 463; 522/184, 186; 264/22

[56] References Cited

U.S. PATENT DOCUMENTS

| | | | |
|---|---|---|---|
| 2,457,087 | 12/1948 | Morgan et al. | 524/297 X |
| 3,714,110 | 1/1973 | Verdol et al. | 524/848 |
| 3,827,999 | 8/1974 | Crossland | 260/880 B |
| 4,504,699 | 3/1985 | Dones et al. | 174/84 R |
| 4,533,598 | 8/1985 | Downey et al. | 524/848 X |
| 4,864,725 | 9/1989 | Debbaut | 524/848 X |

FOREIGN PATENT DOCUMENTS 0046063 3/1982 European Pat. Off. ............ 524/848

*Primary Examiner*—Fred Teskin
*Attorney, Agent, or Firm*—A. Stephen Zavell; Herb Burkard

[57] ABSTRACT

The invention relates to novel gelloid composition comprising a crosslinked non-silicone polymer having an olefinic unsaturated content of less than 10 mole percent and having dispersed therein a liquid in an amount of from about 20% to about about 95% by weight based on the weight of the liquid and polymer and from 0 to 0.3 volume fraction of a filler, said cross-linked polymer
 a) if derived from a solid, relatively high molecular weight polymer, having a gel fraction of at least about 50%, or
 b) if derived from a liquid, relatively low molecular weight polymer, having at least about 0.1 crosslinks per weight average molecule;

said composition having a modulus of $(1+2.5v+14.1v^2)x$ dynes/cm$^2$ wherein x is less than $5\times10^5$ at 30° C. and greater than $5\times10^2$ at 90° C., and v is the volume fraction of the filler, with the proviso that, if the crosslinked polymer is prepared from a solid high molecular eight polymer, the storage modulus at 140° C. is at least about 70% of the storage modulus at 70°C., and a dynamic viscosity of $(1+2.5v+14.1v^2)y$ poises wherein y is less than $1\times10^5$ at 30° C. and greater than $5\times10^2$ at 90° C. and v is the volume fraction of the filler, said composition exhibiting first degree blocking.

17 Claims, No Drawings

METHOD OF MAKING HEAT STABLE POLYMERIC GELLOID COMPOSITION

CROSS-REFERENCE TO RELATED APPLICATIONS

This application is a division of copending application Ser. No. 07/271,394 filed Nov. 10, 1988 now abandoned, which is a continuation of application Ser. No. 06/859,162, filed May 2, 1986, now abandoned, which is a continuation-in-part of application Ser. No. 06/772,073, filed Sep. 3, 1985, now abandoned, which is a continuation-in-part of application Ser. No. 06/646,555, filed Aug. 31, 1984, now abandoned.

BACKGROUND OF THE INVENTION a) Field of the Invention

The invention relates to novel gelloid compositions, methods of making gelloid compositions, methods of covering a substrate and providing an insulative, conductive or stress grading layer of a gelloid composition and gelloid compositions with an electrical device.

b) Background Information

A wide variety of substrates require protection from adverse environmental conditions, including moisture, insects, dirt, plant life and corrosion deposits. In some cases, especially when electrical substrates, such as cable joints, are to be protected, it is desirable to provide a removable protective cover over the substrate, so that it is possible easily to reenter and work on the sealed substrate. A variety of materials have been proposed for this use. In UK published application No. 2,133,026 a sealant having a certain cone penetration and elongation is disclosed. The particular embodiment described in that application utilizes a polyurethane composition containing olefinic unsaturation. These compositions have been found to have relatively low heat stability which has tended to limit their use when they are subjected to elevated temperatures for extended periods of time. Certain electrical devices, particularly those operating at high voltage, e.g. above about 1 kV, may be subjected to operating temperatures of 90° C. or higher from time to time. A sealant composition capable of withstanding such temperatures for an extended period would be advantageous.

In U.S. Patent No. 3,425,967, silicone compositions are described. These silicone compositions show thermal insulating properties and are useful with electrical devices. The silicone compositions, however, have a relatively high water permeability and tend to have low adhesion properties to common solid dielectric materials such as crosslinked polyethylene.

In U.S. Patent No. 3,935,893, a sealant layer is made of a quantity of high and low molecular weight butyl rubber, a liquid polybutylene tackifier, a partially hydrogenated block copolymer of styrene and a conjugated diene, carbon black and curing agents for the butyl rubber. The sealant is designed to heal punctures in vehicle tires and exhibits both adhesive and cohesive second degree blocking.

SUMMARY OF THE INVENTION

Novel compositions have been discovered which have a unique combination of properties especially useful with electrical devices. The compositions exhibit first degree blocking and therefor can be used to seal and to re-enter, are heat stable and may be used for sealing in locations subject to elevated temperatures for extended periods, show low water or oil permeability and thus may reduce corrosion, can be useful in electrical insulating, conductive or stress grading applications, can be formed into shapes, are easy to handle and may be preformed or made in situ, with or without an appropriate backing.

The invention relates to gelloid compositions, methods of making the compositions and use of the gelloid compositions with an electrical device, the gelloid compositions comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  a) if derived from a solid, relatively high molecular weight polymer, having a gel fraction of at least about 50%, or
  b) if derived from a liquid, relatively low molecular weight polymer, having at least about 0.1 crosslinks per weight average molecule;

said composition having a storage modulus of $(1+2.5 v+14.1 v^2)x$ dynes/cm² wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5 v+14.1 v^2)y$ poises wherein y is less than $1 \times 10^5$ at 30° C. and greater than $5 \times 10^2$ at 90° C. and v is the volume fraction of the filler, said composition exhibiting first degree blocking.

Another aspect of the invention comprises a method of making a gelloid composition comprising
  a) providing a liquid composition comprising a non-silicone liquid polymer having low or no unsaturation, a liquid of from about 20 to 95% by weight based on the weight of the total weight of the liquid and polymer and a filler from 0 to 0.3 volume fraction.
  b) subjecting the liquid composition of a) to a crosslinking means to form a gelloid composition comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer having at least about 0.1 crosslinks per weight average molecule;

said composition having a storage modulus of $(1+2.5 v+14.1 v^2)x$ dynes/cm² wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5 v+14.1 v^2)y$ poises wherein y is less than $1 \times 10^5$ at 30° C. and greater than $5 \times 10^2$ at 90° C. and v is the volume fraction of the filler, said composition exhibiting first degree blocking.

Another aspect of the invention comprises a method of insulating a substrate comprising
  a) covering the substrate in the area to be insulated with a gelloid composition, the gelloid composition comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  a) if derived from a solid, relatively high molecular weight polymer, having a gel fraction of at least about 50%, or
  b) if derived from a liquid, relatively low molecular weight polymer, having at least about 0.1 cross-links per weight average molecule;
  said composition having a storage modulus of $(1+2.5\ v+14.1\ v^2)x$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5\ v+14.1\ v^2)y$ poises wherein y is less than $1 \times 10^5$ at 30° C. and greater than $5 \times 10^2$ at 90° C. and v is the volume fraction of the filler, said composition exhibiting first degree blocking and having a volume resistivity of at least $10^{10}$ ohm-cm at 50 Hz; and
  b) covering the gelloid composition with a cover such that the cover surrounds at least a portion of the gelloid composition and at least a portion of the unsurrounded substrate.

Another aspect of the invention comprises a method of relieving electrical stress on a substrate comprising
  a) covering the substrate in the area to be relieved from electrical stress with a gelloid composition comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
    a) if derived from a solid, relatively high molecular weight polymer, having a gel fraction of at least about 50%, or
    b) if derived from a liquid, relatively low molecular weight polymer, having at least about 0.1 cross-links per weight average molecule;
  said composition having a storage modulus of $(1+2.5\ v+14.1\ v^2)x$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5\ v+14.1\ v^2)y$ poises wherein y is less than $1 \times 10^5$ at 30° C. and greater than $5 \times 10^2$ at 90° C. and v is the volume fraction of the filler, said composition exhibiting first degree blocking and having a specific impedance of $10^7$–$10^{10}$ ohm-cm at 50 Hz; and
  b) covering the gelloid composition with a cover such that the cover surrounds at least a portion of the gelloid composition and at least a portion of the uncovered substrate.

Another aspect of the invention comprises an electrical device provided with a gelloid composition which provides electrical insulation, the gelloid composition comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  a) if derived from a solid, relatively high molecular weight polymer, having a gel fraction of at least about 50%, or
  b) if derived from a liquid, relatively low molecular weight polymer, having at least about 0.1 cross-links per weight average molecule;
said composition having a storage modulus of $(1+2.5\ v+14.1\ v^2)x$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5\ v+14.1\ v^2)y$ poises wherein y is less than $1 \times 10^5$ at 30° C. and greater than $5 \times 10^2$ at 90° C. and v is the volume fraction of the filler, said composition exhibiting first degree blocking.

Another aspect of the invention comprises an electrical device provided with a gelloid composition which provides electrical stress grading, the gelloid composition comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  a) if derived from a solid, relatively high molecular weight polymer, having a gel fraction of at least about 50%, or
  b) if derived from a liquid, relatively low molecular weight polymer, having at least about 0.1 cross-links per weight average molecule;
said composition having a storage modulus of $(1+2.5\ v+14.1\ v^2)x$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5\ v+14.1\ v^2)y$ poises wherein y is less than $1 \times 10^5$ at 30° C. and greater than $5 \times 10^2$ at 90° C. and v is the volume fraction of the filler, said composition exhibiting first degree blocking.

DETAILED DESCRIPTION OF THE INVENTION

The crosslinked polymer of the gelloid composition is a non-silicone polymer having an olefinic unsaturated content less than about 10 mole percent, preferably less than about 7 mole percent, and more preferably less than 4 mole percent, and being capable of having a liquid dispersed therein. The low unsaturation content of the polymer contributes to its oxidative stability at elevated temperatures especially around 90° C. The crosslinked polymer may be derived from a solid, relatively high molecular weight polymer or, preferably, from a liquid, relatively low molecular weight crosslinked polymer. If the polymer is derived from a solid, relatively high molecular weight polymer, the polymer should have a gel fraction of at least about 50% (based on the crosslinkable rubber in the composition), preferably at least about 60% and most preferably at least about 70%. If the polymer is prepared from a liquid, relatively low molecular weight polymer, the crosslinked polymer should have at least about 0.1, preferably from about 0.1 to about 3 and more preferably from about 0.5 to about 2.5, crosslinks per weight average molecule. The crosslinked polymer has a liquid dispersed therein of from about 20 to about 95% by weight based on the weight of the polymer plus liquid and preferably from about 40 to about 80%. The liquid can act as a plasticizer, compatibilizer, tackifier or the like for the composition.

The gelloid compositions of this invention are preferably elastomeric and are substantially non-hydrophilic.

A characteristic feature of the gelloid composition is its storage modulus. The storage modulus (often referred to as G') is defined as the stress in phase with the strain in a sinusoidal shear deformation divided by the strain. It is a measure of the energy stored and recovered per cycle when different systems are compared at the same strain amplitude. The storage modulus of the gelloid compositions of the invention is $(1+2.5\,v+14.4\,v^2)x$ dynes/cm$^2$ wherein x is less than $5\times 10^5$ at 30° C. and greater than $5\times 10^2$ at 90° C., measured at 5 radians/sec at a strain of 10%, and wherein v is the volume fraction of filler. The formula $(1+2.5\,v+14.1\,v^2)$ is the standard formula known in the art to account for the effects of any fillers added. (See e.g. Guth, Journal of Applied Physics, vol. 16, pg. 20, 1945). It is also preferred that the storage modulus does not undergo a large change when the temperature is raised to the maximum temperature anticipated during use of the composition. For example, the change in storage modulus as the temperature is raised from about 70° C. to about 140° C. is preferably no more than about 50%, preferably no more than about 20%. If the crosslinked polymer is derived from a solid, relatively high molecular weight polymer, the storage modulus at 140° C. must be at least about 70%, preferably at least about 80%, of the storage modulus at 70° C.

Another characteristic of the gelloid composition of this invention is its dynamic viscosity. The dynamic viscosity relates to the ratio of stress in phase with the rate of strain divided by the rate of strain. The dynamic viscosity of the gelloid composition of the invention is $(1+2.5\,v+14.1\,v^2)y$ poises wherein y is less than $1\times 10^5$ at 30° C. and greater than $5\times 10^2$ at 90° C., measured at 5 radians/sec at a strain of 10%, and wherein v is the volume fraction of the filler. A discussion of storage modulus and dynamic viscosity can be found in *Viscoelastic Properties of Polymers*, Ferry, pg. 43–47, 1970.

The gelloid compositions of this invention exhibit first degree blocking. First degree blocking describes an adherence between the surfaces of the composition under test of such degree that when the upper specimen is lifted the bare specimen will cling thereto, but may be parted with no evidence of damage to either surface. The test is performed according to ASTM D-1146. Blocking of the first degree for compositions of the invention may be either cohesive (between the same material) or adhesive (between the test subject and a substrate).

The term gelloid is used herein to refer to the compositions of this invention as they have the physical appearance of a gelatinous material but do not necessarily have a gel fraction (depending on how the composition has been prepared) and thus might not be considered traditional gels. Gelloid compositions of this invention derived from liquid relatively low molecular weight polymer should have a gel fraction between 0 and about 76% of the crosslinkable polymer. Preferably the composition should have a gel fraction betwten 15% and about 70% and most preferably between about 20% and about 60%. Certain compositions may have a gel fraction of 100% of the crosslinkable polymer. Generally, the amount of plasticizer should be greater in those compositions to give the desired properties.

Preferably, the compositions of the invention should have a cone penetration value as measured by ASTM D-937-77 of from about 30 to about 400 ($10^{-1}$ mm) and preferably from about 50 to about 350 and most preferably from about 80 to about 150 ($10^{-1}$ mm). Further, said composition should preferably have an elongation as measured by ASTM D-412 of from about 25% to about 850% and more preferably from about 100 to about 750 and most preferably from about 150% to 300%.

The electrical properties of the composition can vary making them useful in insulation, stress grading and conductive applications In insulation applications, the compositions should have a dielectric constant (permittivity) of less than 6 at 50 Hz (as measured by ASTM D-150) and a volume resistivity of at least $10^{10}$ ohm-cm at 50 Hz (as measured by ASTM D-257). For stress grading applications the compositions preferably have a dielectric constant of greater than 6 and a specific impedance of $10^7$–$10^{10}$ ohm-cm at 50 Hz (ASTM D-150), and for conductive applications the compositions preferably have a volume resistivity of less than $10^7$ ohm-cm at 50 Hz.

As mentioned above, the compositions of this invention can be derived from a liquid, relatively low molecular weight polymer. The invention also comprises a method for making a gelloid composition comprising subjecting a non-silicone liquid polymer, and a liquid from about 20% to 95% to a crosslinking means such as a chemical means or irradiation means. The polymer starting material is a crosslinkable liquid polymeric material, preferably a non-silicone liquid rubber, with low or no unsaturation prior to crosslinking. The liquid polymeric material preferably has a molecular weight of less than about 90,000, preferably less than about 50,000, and a Mooney viscosity of ML 1+4 at 100° C. of less than 10. Mooney viscosity is measured by ASTM D-1646. Said polymers are primarily liquids at these molecular weights and viscosities. The liquid polymer preferably has a molecular weight less than about 7.5 times the polymer's critical molecular weight (see e.g. Mechanical prop of Polymers, Nielsen 1962 for a discussion of critical molecular weight). The polymers can be a hydrocarbon backbone polymer or a polymer containing carbon as well as other atoms, e.g. oxygen, nitrogen etc. in the backbone with the exception of silicone. The polymers are limited to those which have low or no unsaturation prior to crosslinking. In general, the amount o unsaturation will be less than about 10% mole, preferably less than about 7 mole percent and preferably less than 4 mole percent. If the unsaturation is too high the resulting product tends to be thermally unstable.

Preferred liquid polymeric materials include liquid butyl rubber, epichlorohydrin rubber, ethylene-propylene-diene monomer rubber (EPDM), hydrogenated polyisoprene, hydrogenated polybutadiene, hydrogenated styrene-butadiene rubber (SBR), hydrogenated polychloroprene, functionalized polyisobutylene (i.e. polyisobutylene with reactive groups added that are capable of crosslinking such as hydroxy, amine or carboxy groups), chlorinated polyethylene, liquid fluorinated polymers (e.g. Viton from DuPont), hydrogenated nitrile rubber and other hydrogenated liquid polymers. Further, one can combine the various polymers to form compositions of desired properties.

The liquid dispersed in the crosslinked polymer in accordance with this invention can be any liquid which is capable of being dispersed in the polymer in an amount from about 20% to about 95%, and which does not react during crosslinking of the polymer. The liquid may be a plasticizer, compatibilizer, tackifier, or the like. Suitable liquids include, for example, paraffinic oils, naphthenate oils, aromatic oils, liquid polybutenes, alkyl (or aryl) phthalates, vegetable oils, mineral oils, trimellitates, esters of polyethylene glycols, alkyl (or aryl) phosphates, methyl ester of hydrogenated wood rosin, liquid rosin oils, pine tar, polyterpenes, non-reacting liquid rubbers, the starting liquid polymer which remains uncrosslinked or at least crosslinked less than about 0.1 crosslink per weight average molecule, and the like.

Crosslinking may be effected by any conventional crosslinking means, preferably UV means, irradiation means or by chemical means. Radiation crosslinking can be accomplished by electron beam, or the like treatment. Suitable crosslinking promoters can be incorporated to encourage radiation crosslinking such as triallylcyanuate and triallyliso-cyanuate. Suitable chemical crosslinking agents can be chosen based on the individual polymer or polymers used. For example, a phenolic resin or p-quinone dioxime can be used to cure butyl rubber, peroxide can be used to cure EPDM or diisocyanate dimer acid can be used to cure epichlorohydrin rubber.

Optionally, plasticizers may be added to help obtain a gelloid with the desired cone penetration values. Such plasticizers preferably would include all liquids which are capable of reducing the viscosity of the base rubber, have low or no unsaturation as described above and are compatible with the base rubber.

A filler may be added to the composition, if desired. Generally, the amount of filler added is from 0 to 0.3 volume fraction. Preferably, the filler is in an amount from 0.1 to 0.2 volume fraction. The term "filler" is used herein to include all solid additives including particulate matter or fibrous matter present in the composition. These fillers include pigments, fillers known for conductive (both electrical and thermal), stress grading and insulative purposes e.g. carbon black, barium titanate, zinc oxide, iron oxide, silicone carbide, metals and the like, reinforcing agents, thermal stabilizers, fungicides, biocides, flame retardants, for example, aluminum trihydrate, and the halogenated flame retardants, leak indicators (i.e. chemicals which react upon exposure to certain chemicals), corrosion inhibitors, ultraviolet light stabilizers, processing aids, impact modifiers and the like.

The compositions are formed preferably by mixing a liquid non-silicone polymer with any desired fillers in an amount of from 0 to 0.3 volume fraction, any crosslinking agents or the like and the liquid and subjecting the mixture to a crosslinking means. The composition will generally take the shape of the container during crosslinking but can be reshaped e.g. by cutting as desired. It is also possible to form the composition in situ, i.e. by applying the liquid polymer and compatible liquid in the location to be used and crosslinking at that particular location As described above the gelloid compositions, because of their specific physical properties, have several useful properties and are therefore useful especially in electrical devices such as in cable splices, terminations, breakouts, electrical connections. A further aspect of the invention comprises electrical devices with the gelloid compositions, the gelloid compositions comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
   a) if derived from a solid, relatively high molecular weight polymer, having a gel fraction of at least about 50%, or
   b) if derived from a liquid, relatively low molecular weight polymer, having at least about 0.1 crosslinks per weight average molecule;
said composition having a storage modulus of $(1+2.5 v+14.1 v^2)x$ dynes/cm$^2$ wherein x is less than $5\times10^5$ at 30° C. and greater than $5\times10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5 v+14.1 v^2)y$ poises wherein y is less than $1\times10^5$ at 30° C. and greater than $5\times10^2$ at 90° C. and v is the volume fraction of the filler, said composition exhibiting first degree blocking.

The gelloid compositions may be made into cold applied tapes, with or without a backing, (said backing usually being polymeric), used with molded rubbers, attached to dimensionally recoverable tubular and sheet products; used with heat shrinkable tapes. They can be formed into shaped articles, such as, profiles shaped to accommodate an adjacent pair of conductors or cables. Shaped articles are particularly useful where a seal is necessary. A particular gelloid may therefore be chosen based on the particular application of the gelloid and the desired properties. It is a desirable property of these gelloids that they are easily handled and reenterable when used in, for example, splices or terminations. When said gelloids are applied to a support such as a backing, a molded rubber, or are in a container they may be adhered to the support by any convenient method. For example, they may stick due to their own tackiness i.e. first degree blocking, may be heat treated, may be formed in situ or mastics and adhesives may be used to further enhance or make permanent the adhesion. Other means of applying the gelloids include both internal and external use of solder, wirebond or crimps.

As is readily apparent the compositions of the invention are extremely versatile in their ability to be used in a variety of situations especially electrical use. The above list is illustrative of such uses and is provided as illustration and not limitation. One skilled in the art would be able to provide alternative uses as are contemplated by the invention. In order to describe more fully the invention several uses of a gelloid composition and a gelloid composition with an electrical device are described in detail below.

The composition can be used to seal the cover of a low voltage (i.e. below about 1000 volts) cable joint to the cables adjacent the joint. Two cables have their outer layer of insulation, shielding and protection removed to expose bare conductors. The conductors are then connected by a connector. A tape of a composition of this invention is wrapped around the bare conductors extending just beyond the remaining layer. A cover (e.g. heat shrink material, tape. etc.) is positioned such that it covers the connected conductors and extends beyond the gelloid composition tapes. The tapes provide environmental seals between the cover and the cables.

Because an environmental seal can be provided, the gelloid compositions can be used in a wide variety of situations and applied where corrosion protection is necessary. The composition for example can be used to bond cover to a substrate. A tape of this composition is positioned circumferentially around a pipeline. A similar tape is likewise positioned a given distance from the first tape. A cover (e.g. heat shrunk material, tape, etc.) is positioned such that it covers the pipeline extending at each end just beyond the tapes positioned on the pipeline When gelloid compositions of the invention are insulative, conductive, or stress grading they can be used for example in high voltage applications. When jointing high voltage cables (i.e. above 1 kV), the insulation, shielding, grounding, jacket, etc., must be stripped back to expose the conductors The exposed conductors are then connected by mechanical means such as connectors, solder, wire, etc. The area of the exposed connection is under high electrical stress. Gelloids of the invention having a specific impedance of $10^7$–$10^{10}$ ohm-cm at 50Hz can be applied to these areas as stress grading material This gelloid material is also placed immediately adjacent the connection at the end of the cutback shielding or other conductive layer and any other area of the joint where stress grading is necessary. A composition of the invention which is an insulating material, that is, has a volume resistivity of at least $10^{10}$ ohm-cm, can be placed over the stress grading inner layer. Likewise, the conductive gelloids, i.e. those having a volume resistivity of less than $10^7$ ohm-cm, can be outer conductive layer on such high voltage joint placed over the insulating layer. Likewise, when terminating a high voltage cable a stress grading inner and insulating outer layers of the gelloid material can be used.

Conductive gelloid compositions of the invention can be used to prevent high voltage discharge from any protrusion in a high voltage application, for example a busbar connection. They can be used as shielding on cables to mask R.F. signals from interference or being picked up, e.g. cryptographic cable equipment. The conductive gelloids have a wide variety of uses as electrical contacts. Because the gels exhibit first degree blocking separation of the two pieces of gelloid material is gradual rather than abrupt as in metallic electrical contacts Therefore the contact exhibits progressive resistance rather than abrupt increases in resistance. This progressive resistance is useful in preventing arcing between electrical contact points Further they can be used as contact between two different metal electrical contacts e.g. aluminum and copper, to prevent bimetallic corrosion i.e. sacrificial anode corrosion.

Another use would be to insulate light bulb sockets from corrosion, providing a non-corrodable ground path, or provide anti-corrosion for a battery connection or other surfaces. The composition can be made pressure sensitive i.e. the conductivity changes with thickness of the material, and be used as a pressure transducer.

Because the gelloids exhibit first degree cohesive and adhesive blocking the conductive gelloids can be used as bioelectrical contacts, for example, EKG contacts, heart rate monitor contacts or even used as a conductive gel on cardiac electro stimulation devices i.e. electrical output devices for restarting a stopped heart. The gels would be especially useful because of the ease of application and ease of cleanup. Gels, adhesives and greases which exhibit second degree cohesive blocking are difficult to remove from the skin and generally cannot be preformed into shapes as can the gelloids of the invention.

The following examples are illustrative only and are not to be construed as limiting the invention. One skilled in the art would readily be able to select appropriate crosslinking agents, crosslink promoters, liquid rubbers, radiation amounts, particular uses, etc. for a particular application without undue experimentation.

DESCRIPTION OF THE PREFERRED EMBODIMENTS

Example 1

Chemically crosslinked polyisobutylene (dielectric gelloid)

The following formulation was mixed in a Sigma mixer then was cured for 30 minutes at 100° C. to form a gelloid.

| | |
|---|---|
| Liquid butyl rubber | 100 g |
| Zinc Stearate-filler | 5 g |
| Zirex (Zinc Resinate)-chemical crosslinking activator and filler | 10 g |
| Paraffinic oil - plasticizer liquid | 90 g |
| p-Quinone Dioxime (62.5% in oil)-crosslinking agent | 3.2 g |
| Lead dioxide (50% in dibutylphthalate)-cure actuator | 3.2 g |
| Carbon black - colorant & U.V. light stabilizer | 2 g |

The resulting gelloid had a volume resistivity of $10^{14}$ ohm-cm (ASTM D-150), a permittivity @ 50 Hz of 3.0 (ASTM D-257) a cone penetration of 112 and elongation of 350%. The compositions did not exhibit a gel fraction. The storage modulus: $1.47 \times 10^5$ dynes/cm$^2$ @ 30° C.; $4.8 \times 10^4$ dynes/cm$^2$ at 90° C. Dynamic viscosity: $3.0 \times 10^4$ poises at 30° C.; $9.9 \times 10^3$ poises at 90° C. and exhibits first degree blocking.

Example 2

The formulation of Example 2 is made substituting a reactive phenolic resin as a cure agent in place, e.g. p-quinone dioxime. Volume resistivity of $10^{14}$ ohm-cm, permittivity of 3.0, cone penetration of 50.

Example 3

Chemically crosslinked epichlorohydrin (stress grading gelloid-oil resistant)

The following formulation was mixed and then cured for 60 minutes at 100° C. to form a gelloid.

| | |
|---|---|
| Hydrin 10XI (liquid epichlorohydrin rubber) | 100 g |
| Dimer acid diisocyanate-crosslinking agent | 46 g |
| dioctyl phthalate-plasticizer - liquid | 100 g |
| T-12 - tin catalyst | 10 g |
| Dabco 33LV (Tertiary amines - co-catalyst) | 2 g |
| Antioxidant 2246-substituted phenol type of antioxidant | 0.8 g |

The resulting gelloid had a specific impedance at 50 Hz of $1.8 \times 10^9$; a permittivity @ 50 Khz of 7.7, a cone penetration value of 51.

Example 4

Chemically crosslinked epichlorohydrin (stress grading gelloid-oil resistant)

The following formulation was mixed and then cured for 60 minutes at 100° C. to form a gelloid.

| | |
|---|---|
| Hydrin 10X1 (liquid epichlorohydrin rubber) | 100 g |
| Versamid 125 (liquid polyamide) | 15 g |
| Diundecyl phthalate-plasticizer - liquid | 50 g |
| Lectro 78 (lead stabilizer) | 5 g |
| Red iron oxide | 15 g | cured at 90° C. for 4 hours.

The resulting gelloid had a specific impedance at 50 Hz of $1.5 \times 10^8$; a permittivity @ 50 Hz of 18.9, a cone penetration value of 150.

Example 5

Electron Beam Radiation crosslinked EPDM dielectric gelloid

| | |
|---|---|
| Kalox (liquid EPDM) - liquid rubber | 100 g |
| Kaydol oil (mineral oil) plasticizer liquid | 90 g |
| Trimethylol propane trimethacrylate (crosslinking promoter) | 2 g |

Irradiated at 10-20 megarad resulted in gelloids with cone penetration value of 50-56. Resistivity of $10^{14}$ ohm-cm, permittivity of 2.7 @ 50 Khz and elongation of 200%.

Example 6

Peroxide crosslinked EPDM dielectric gelloid

| | |
|---|---|
| Kalox (liquid EPDM) - liquid rubber | 100 g |
| Indopol H100 (polybutene) plasticizer - liquid | 90 g |
| D-cup 40KE (Dicumyl peroxide) - crosslinking agent | 7 g |

Crosslinked at 150° C. for one hour resulted in a gelloid with cone penetration value of 144. Resistivity of $10^{14}$ ohm-cm permittivity 2.7.

Example 7

Stress Grading Butyl gelloid

| | |
|---|---|
| Kalene 200 (liquid butyl rubber) | 100 g |
| Kaydol oil (mineral oil) liquid | 95 g |
| p-quinone dioxime dispersion (62.5%) | 4.8 g |
| Lead dioxide dispersion (50%) | 18 g |
| N990 Carbon Black (Thermax MT) | 69.4 g |
| S37 Carbon Black (Vulcan P) | 14.7 g |

Crosslinked at 100° C. for 30 minutes resulted in a gelloid with cone penetration value of 81, a specific impedance of $9.5 \times 10^8$, a permittivity of 32.6.

Example 8

Conductive Butyl Gelloid

| | |
|---|---|
| Kalene 200 (liquid Butyl rubber) | 100 g |
| Kaydol oil (mineral oil) plasticizer liquid | 95 g |
| p-quinone dioxime dispersion (62.5%) curing agent | 4.8 g |
| Lead dioxide dispersion (50%) curing activator | 18 g |
| Ketjen carbon black (conductive carbon black) | 20 g |

The above formulation was crosslinked at 100° C. for 30 minutes and resulted in a gelloid with cone penetration value of 42, volume resistivity $2.4 \times 10^5$ ohm-cm.

Example 9

Gel Tape Formulation

| | |
|---|---|
| Kalene 800 (liquid butyl rubber) | 100 |
| Sunpar 2280 (plasticizer) (paraffinic oil) | 102 |
| Kenmix PbO$_2$ Dispersion (lead oxide) | 15 |
| Austin Black (Carbon black) | 3 |
| Irgonox 1010 (Antioxidant) | 1 |
| Antozite 1 (Antioxidant) | 1 |
| SAG47 (silicone antifoaming agent) | 3.4 |
| Quinone Dioxime Dispersion (62.5% in light Circo oil) | 4.5 |
| Vancide 89 (Fungicide) | 2.8 |
| | 232.7 |

Cured 3 hours @ 90° C.
Gel content (based on liquid butyl rubber)=47%.
Storage modulus at 30° C.=$1.6 \times 10^5$ dynes/cm$^2$
Storage modules at 90° C.=$1.0 \times 10^5$ dynes/cm$^2$
Dynamic viscosity at 30° C.=$3.4 \times 10^4$ poises
Dynamic viscosity at 90° C.=$2.0 \times 10^4$ poises exhibits first degree blocking.

Example 10

Gel Tape Formulation

| | |
|---|---|
| Kalene 800 (liquid butyl rubber) | 100 |
| Sunpar 2280 (plasticizer) (paraffinic oil) | 130 |
| Zinc Oxice Dispersion (80%) | 6.25 |
| Statex N660 (Carbon black) | 2 |
| Irgonox 1076 (Antioxidant) | 2 |
| SAG47 (silicone antifoaming agent) | 1 |
| HRJ2564 (Phenolic Resin) | 12 |
| | 253.25 |

Cured 50 minutes @ 150° C.
Gel content (based on liquid butyl rubber)=78%.
Storage modulus at 30° C.=$1.7 \times 10^4$ dynes/cm$^2$
Storage modules at 90° C.=$7.3 \times 10^3$ dynes/cm$^2$
Dynamic viscosity at 30° C.=$4.2 \times 10^4$ poises
Dynamic viscosity at 90° C.=$2.0 \times 10^4$ poises
Exhibits first degree blocking.

We claim:

1. A method of making a gelloid composition comprising:
    a) providing a liquid composition comprising a non-silicone liquid polymer having low or no unsaturation, a liquid of from about 20 to 95% by weight based on the weight of the total weight of the liquid and polymer, wherein the non-silicone liquid polymer is selected from the group consisting of butyl rubber, epichlorohydrin rubber, ethylene-propylene-diene monomer rubber, hydrogenated SBR, hydrogenated nitrile rubber and functionalized polyisobutylene, and, wherein the liquid is non-reactive during crosslinking or at least crosslinked to less than about 0.1 crosslinks per weight average molecule, and a filler from 0 to 0.3 volume fraction; and
    b) subjecting the liquid composition of a) to a crosslinking means to form a gelloid composition comprising a crosslinked non-silicone polymer having an olefinic unsaturated content of less than 10 mole percent and having at least about 0.1 crosslinks per weight average molecule, having dispersed therein a liquid in an amount of from about 20% to about 95% by weight based on the weight of the liquid polymer, and from 0 to 0.3 volume fraction of a filler, said gelloid composition having a storage modulus of $(1+2.5 \text{ v}+14.1 \text{ v}^2)x$ dynes/cm$^2$ wherein x is less than $5\times10^2$ at 30° C. and greater than $5\times10^3$ at 90° C., and v is the volume fraction of the filler and, a dynamic viscosity of $(1+2.5 \text{ v}+14.1 \text{ v}^2)y$ poises wherein y is less than $1\times10^5$ at 30° C. and greater than $5\times10^2$ at 90° C. and v is the volume fraction of the filler, and exhibiting first degree blocking.

2. A method according to claim 1, wherein the dispersed liquid is selected from the group consisting of mineral oil, paraffinic oil and dioctyl phthalate.

3. The method according to claim 2 wherein the crosslinking means crosslinks said liquid composition to from about 0.1 to about 3 crosslinks per weight average molecule.

4. The method according to claim 3 wherein the crosslinking is from about 0.5 to about 2.5 crosslinks per weight average molecule.

5. The method according to claim 4 wherein the crosslinking means is selected from the group consisting of chemical crosslinking, radiation crosslinking, or UV crosslinking.

6. A method according to claim 1 wherein the crosslinking means is chemical crosslinking.

7. A method according to claim 6 wherein the chemical crosslinking means is p-quinone dioxime.

8. A method according to claim 6 wherein the chemical crosslinking means is a phenolic resin.

9. A method according to claim 6 wherein the chemical crosslinking means is diisocyanate dimer acid.

10. A method according to claim 1 wherein crosslinking means is radiation crosslinking.

11. A method according to claim 1 wherein crosslinking means is UV crosslinking.

12. A method according to claim 1 wherein the liquid polymer has a molecular weight of less than about 7.5 times the critical molecular weight of the polymer.

13. A method according to claim 1 wherein the dispersed liquid is a non-silicone liquid polymer having less than about 0.1 crosslinks per weight average molecule.

14. A method according to claim 1 wherein the non-silicone liquid polymer and the dispersed liquid are the same.

15. Method according to claim 1 wherein the crosslinking means crosslinks said liquid composition to from about 0.1 to about 3 crosslinks per weight average molecule.

16. The method according to claim 15 wherein the crosslinking is from about 0.5 to about 2.5 crosslinks per weight average molecule.

17. The method according to claim 16 wherein the crosslinking means is selected from the group consisting of chemical crosslinking, radiation crosslinking, or UV crosslinking.

* * * * *

UNITED STATES PATENT AND TRADEMARK OFFICE
CERTIFICATE OF CORRECTION

PATENT NO.    : 5,177,143

INVENTOR(S)   : Chang et al.

DATED         : January 5, 1993

It is certified that error appears in the above-identified patent and that said Letters Patent is hereby corrected as shown below:

Cover Page, Abstract [57], line 14, after "a" insert --storage--.

Cover Page, Abstract [57], line 19, replace "eight" by --weight--.

Column 5, line 23, replace "14.4" by --14.1--.

Column 6, line 6, replace "betwten" by --between--.

Column 6, line 19, replace "100 to about 750" by --100% to about 750%--.

Column 6, line 23, replace "applications In" by --applications. In--.

Column 6, line 59, replace "o" by --of--.

Column 9, line 33, replace "area" by --areas--.

UNITED STATES PATENT AND TRADEMARK OFFICE
CERTIFICATE OF CORRECTION

PATENT NO. : 5,177,143

INVENTOR(S) : Chang et al.

DATED : January 5, 1993

It is certified that error appears in the above-identified patent and that said Letters Patent is hereby corrected as shown below:

Column 9, line 57, replace "contacts Therefore" by --contacts.  Therefore--.

Column 9, line 60, replace "points Further" by --points.  Further--.

Column 10, line 46, replace 9 9 x $10^3$" by -- 9.9 x $10^3$--.

Column 11, line 47, replace "ohm-cm" by --ohm-cm,--.

Column 11, line 57, replace "Black)" by --Black--.

Column 12, line 38, replace Oxice" by --Oxide--.

Signed and Sealed this

Twenty-fourth Day of May, 1994

BRUCE LEHMAN

*Attest:*

*Attesting Officer*     Commissioner of Patents and Trademarks